US012287536B2

(12) United States Patent
Spratt et al.

(10) Patent No.: US 12,287,536 B2
(45) Date of Patent: *Apr. 29, 2025

(54) PROGRESSIVE SPECTACLE LENS

(71) Applicant: Carl Zeiss Vision International GmbH, Aalen (DE)

(72) Inventors: Ray Steven Spratt, Petaluma, CA (US); Saulius Varnas, Brighton (AU); Philipp Jester, Heidenheim an der Brenz (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,674

(22) Filed: Apr. 29, 2024

(65) Prior Publication Data

US 2024/0302679 A1 Sep. 12, 2024

Related U.S. Application Data

(63) Continuation of application No. 18/647,121, filed on Apr. 26, 2024, which is a continuation of application
(Continued)

(30) Foreign Application Priority Data

Apr. 30, 2021 (WO) ................ PCT/US2021/030236

(51) Int. Cl.
*G02C 7/06* (2006.01)
*G02C 7/02* (2006.01)

(52) U.S. Cl.
CPC ............. *G02C 7/061* (2013.01); *G02C 7/027* (2013.01); *G02C 2202/08* (2013.01); *G02C 2202/24* (2013.01)

(58) Field of Classification Search
CPC ............ G02C 2202/24; G02C 2202/08; G02C 7/027; G02C 7/061
(Continued)

(56) References Cited

U.S. PATENT DOCUMENTS 4,786,160 A 11/1988 Fürter
6,343,861 B1 2/2002 Kris et al.
(Continued)

FOREIGN PATENT DOCUMENTS

CN 203101748 U 7/2013
CN 105380775 A 3/2016
(Continued)

OTHER PUBLICATIONS

Saw et al., "Myopia and associated pathological complications", Ophthalmic Physiol Opt., No. 25, pp. 381-391, 2005.
(Continued)

*Primary Examiner* — Darryl J Collins
(74) *Attorney, Agent, or Firm* — Tautz & Schuhmacher LLC; Georg Hasselmann

(57) ABSTRACT

A progressive spectacle lens, a method for its production, and a related computer program are disclosed. The progressive spectacle lens has a progressive surface including a central viewing zone, a lower viewing zone, two peripheral vision zones extending bilaterally from a vertical meridian of the progressive surface, and an upper viewing zone. The central viewing zone has a surface power providing a first refracting power for distance vision and the lower viewing zone has a greater surface power than the central viewing zone providing a second refracting power corresponding to near vision and being connected to the central viewing zone by a first progressing power region. The progressive spectacle lens generates a retarding or arresting effect on myopia progression, especially in myopic juveniles.

20 Claims, 5 Drawing Sheets

Related U.S. Application Data

No. 18/489,950, filed on Oct. 19, 2023, now Pat. No. 12,001,087, which is a continuation of application No. PCT/EP2022/061453, filed on Apr. 29, 2022.

(58) Field of Classification Search
USPC .................................................. 351/159.42
See application file for complete search history.

(56) References Cited

U.S. PATENT DOCUMENTS

| | | | |
|---|---|---|---|
| 6,390,623 B1 | 5/2002 | Kokonaski et al. | |
| 6,554,425 B1* | 4/2003 | Roffman | G02C 7/042 351/159.74 |
| 7,862,171 B2 | 1/2011 | Varnas et al. | |
| 8,540,365 B2 | 9/2013 | Varnas | |
| 8,833,936 B2 | 9/2014 | Varnas | |
| 2004/0008320 A1 | 1/2004 | Shiryanagi | |
| 2009/0310082 A1* | 12/2009 | Varnas | G02C 7/06 351/159.42 |
| 2012/0257161 A1* | 10/2012 | Varnas | G02C 7/06 351/159.42 |
| 2015/0331255 A1* | 11/2015 | Sankaridurg | G02C 7/043 351/159.75 |
| 2016/0054587 A1 | 2/2016 | Brennan et al. | |
| 2016/0062413 A1 | 3/2016 | Sano et al. | |
| 2017/0108712 A1 | 4/2017 | Guilloux | |

FOREIGN PATENT DOCUMENTS

| | | | | |
|---|---|---|---|---|
| CN | 105388628 A | | 3/2016 | |
| CN | 106461975 A | | 7/2017 | |
| CN | 110068938 A | | 7/2019 | |
| EP | 2752703 A1 | | 7/2014 | |
| EP | 2069854 B1 | | 4/2015 | |
| GB | 2380810 A | * | 4/2003 | ............ G02C 7/061 |
| WO | 2006/116820 A1 | | 11/2006 | |
| WO | 2013134825 A1 | | 9/2013 | |
| WO | 2014019968 A1 | | 2/2014 | |
| WO | 2017/064041 A1 | | 4/2017 | |

OTHER PUBLICATIONS

Vitale et al., "Increased prevalence of myopia in the United States between 1971-1972 and 1999-2004," Arch. Ophthalmol, vol. 127, No. 12, pp. 1632-1639, 2014.

Chiang et al., "Public Health Impact of Pahtologic Myopia," Pathologic Myopia, vol. 6, pp. 75 to 81, 2014.

Hasebe et al., "Myopia control with positively aspherized progressive addition lenses: a 2-year, multicenter, randomized, controlled trial," IOVS, vol. 55, No. 11, pp. 7177-7188, Nov. 2014.

Williams et al., "Increasing Prevalence of Myopia in Europe and the Impact of Education," Ophthalmology, vol. 122, No. 7, pp. 1489-1497, Jul. 2015.

Holden et al., "Global Prevalence of Myopia and High Myopia and Temporal Trends from 2000 through 2050," Ophthalmology, No. 123, pp. 1036-1042, 2016.

Morgan et al., "A New Epidemic of High Myopia and Pathologic Myopia?," Cover Focus, Jun. 2016.

Wolffsohn et al., "IMI—Myopia control reports overview and introduction," IOVS, Special Issue, vol. 60, No. 3, M1-M19, 2019.

Wildsoet et al., "IMI—Interventions for Controlling Myopia Onset and Progression Report," IOVS, Special Issue, vol. 60, No. 3, M106-M131, 2019.

Industrial Norm "Ophthalmic optics—Spectacle lenses—Vocabulary (ISO 13666:2019)," English version EN ISO ISO 13666:2019, Dec. 2019.

Spaide et al., "Pathologic Myopia," ISBN 978-1-4614-8337-3, pp. 59 to 66, 2021.

Written opinion of the international preliminary examining authority issued in PCT/EP2022/061453, to which this application claims priority, mailed Feb. 22, 2023.

International Preliminary Report on Patentability issued in PCT/EP2022/061453, to which this application claims priority, mailed Jul. 20, 2023.

Office Action by the Chinese Patent Office (SIPO) issued in CN 202411164792.6, which is a counterpart hereof, mailed on Jan. 23, 2015 and English translation thereof.

* cited by examiner

PROGRESSIVE SPECTACLE LENS

CROSS REFERENCE TO RELATED APPLICATIONS

This application is a continuation application of U.S. patent application Ser. No. 18/647,121, filed on Apr. 26, 2024, which is a continuation application of U.S. patent application Ser. No. 18/489,950, filed on Oct. 19, 2023, which is a continuation application of international patent application PCT/EP2022/061453, filed on Apr. 29, 2022 and designating the U.S., which claims priority to international patent application PCT/US2021/030236, filed on Apr. 30, 2021, all of which are hereby incorporated by reference in their entireties.

TECHNICAL FIELD

The present disclosure relates to a progressive spectacle lens, a method for producing a progressive spectacle lens, and a computer program comprising instructions which, when the program is executed by a computer, cause the computer to carry out the steps of the method for producing the progressive spectacle lens.

BACKGROUND

As described in Holden, B. A.; Fricke, T. R.; Wilson, D. A.; Jong, M.; Naidoo, K. S.; Sankaridurg, P.; Wong, T. Y.; Naduvilath, T. J.; Resnikoff, S., Global Prevalence of Myopia and High Myopia and Temporal Trends from 2000 through 2050, Ophthalmology 2016, 123, pp. 1036-1042, doi: 10.1016/j.ophtha.2016.01.006; Morgan, I. G.; He, M.; French, A. N.; Rose, K. A., A New Epidemic of High Myopia and Pathologic Myopia? Cataract Refract. Surg. Today Eur. 2016 June, pp. 70-73; Williams, K. M.; Bertelsen, G.; Cumberland, P.; Wolfram, C.; Verhoeven, V. J.; Anastasopoulos, E.; Buitendijk, G. H., Increasing Prevalence of Myopia in Europe and the Impact of Education, Ophthalmology 2015, 122, pp. 1489-1497; and Vitale, S.; Sperduto, R. D.; Ferris, F. L., Increased prevalence of myopia in the United States between 1971-1972 and 1999-2004, Arch. Ophthalmol. 2009, 127, pp. 1632-1639, in more detail, epidemiologic surveys from different parts of the world have documented an increased prevalence of myopia. Myopia not only makes distance vision blurry but also, by way of pathologic changes in the retina and choroid associated with extensive elongation of the eye, increases risks for developing macular degeneration, retinal detachment, and glaucoma in the latter half of life; see, e.g., Saw, S.-M.; Gazzard, G.; Shih-Yen, E. C.; Chua, W. H. Myopia and associated pathological complications, Ophthalmic Physiol Opt. 2005, 25, 381-391; Chiang, P. P.-C.; Fenwick, E.; Cheung, C. M. G.; Lamoureux, E., Public Health Impact of Pathologic Myopia. In: Spaide R F, Ohno-Matsui K, Yannuzzi L A, Eds. Pathologic Myopia, USA, New York: Springer-Verlag, pp. 59 to 66, 2021. Hence, it is desirable to improve preventive treatment for myopia in childhood when myopia progression and axial elongation are most rapid.

Based on experimental results which demonstrate that a hyperopic retinal defocus elongates the axial length of an eye, leading to the progression of myopia, while an image clearly focused on the retina or in front of it would work as a stop signal for the elongation, it has been proposed to use progressive spectacle lenses which are capable of reducing both a lag of accommodation and a hyperopic defocus on the peripheral retina in order to generate a retarding effect on myopia progression, see, e.g., Wolffsohn J S., Flitcroft D. I., Gifford K. L., et al., IMI-Myopia control reports overview and introduction, Invest. Ophthalmol. Vis. Sci. 60, 2019, M1-M19; and Wildsoet C. F., Chia A., Cho P., et al., IMI-Interventions for Controlling Myopia Onset and Progression Report, Invest. Ophthalmol. Vis. Sci. 60, 2019, M106-M131.

U.S. Pat. No. 4,786,160 A discloses a multi-focal spectacle lens having two progressive zones which are spatially separated from each other and which provide smooth transition of dioptric power, from one to the next of three different viewing-distance regions. The progressive surface is calculated in accordance with the technique of spline analysis and is twice continuously differentiable. In a particular embodiment, the progressive lens has a central viewing zone for distance vision, a lower viewing zone having an addition power of +1.75 D for near vision, and an upper viewing zone having the addition power of +1.00 D for intermediate vision.

U.S. Pat. No. 6,343,861 B1 discloses a progressive ophthalmic lens element including a lens surface having an upper viewing zone having a surface to achieve a refracting power corresponding to distance vision, a lower viewing zone having a greater surface power than the upper viewing zone to achieve a refracting power corresponding to near vision, and an intermediate zone extending across the lens element having a surface power varying from that of the upper viewing zone to that of the lower viewing zone and including a corridor of relatively low surface astigmatism, the progressive ophthalmic lens element including progressive design elements selected to reduce myopia progression.

U.S. Pat. No. 7,862,171 B2 discloses an ophthalmic lens element for correcting myopia in a wearer's eye. The lens element includes a central viewing zone and a peripheral zone. The central viewing zone provides a first optical correction for substantially correcting myopia associated with the foveal region of the wearer's eye. The peripheral zone surrounds the central viewing zone and provides a second optical correction for substantially correcting myopia or hyperopia associated with a peripheral region of the retina of the wearer's eye. A system and method for dispensing or designing an ophthalmic lens element for correcting myopia in a wearer's eye is also disclosed.

U.S. Pat. No. 8,540,365 B2 discloses an ophthalmic lens element which includes a front surface and a rear surface, at least one of which includes a horizontal meridian and a vertical meridian. A central viewing zone of the lens element includes a foveal vision zone providing a first power for providing clear foveal vision for a wearer. A peripheral region of positive power relative to the first power is also included. The peripheral region includes dual progressive zones located bilaterally of the vertical meridian and extending radially outwardly from the central viewing zone. The lens element provides a distribution of surface astigmatism which provides, on the horizontal meridian, a relatively low surface astigmatism in the central viewing zone and the progressive zones.

U.S. Pat. No. 8,833,936 B1 discloses a progressive ophthalmic lens having an upper viewing zone, a lower viewing zone, a corridor, and a peripheral region disposed on each side of the lower viewing zone. The upper viewing zone includes a distance reference point (DRP) and a fitting cross (FC) and provides a first refracting power for distance vision. The lower viewing zone, which is for near vision, provides an addition power relative to the first refracting power. The corridor connects the upper and lower zones and provides a refracting power varying from that of the upper viewing zone to that of the lower viewing zone. Each peripheral region includes a zone of positive power relative to the addition power which provides therein a positive refracting power relative to the refracting power of the lower viewing zone. The zones of relative positive power are disposed immediately adjacent to the lower viewing zone such that the lower viewing zone interposes the zones of relative positive power.

EP 2 069 854 B1 discloses an ophthalmic lens element which includes a central viewing zone of low surface astigmatism and a peripheral region. The central viewing zone includes an upper viewing zone for providing a first power suitable for a wearer's distance vision tasks. The peripheral region has a positive power relative to the first power and surrounds the central viewing zone. The peripheral region provides an optical correction for retarding or arresting myopia for a wearer and includes one or more regions of relatively higher surface astigmatism, a lower or near viewing zone of low surface astigmatism, and a corridor of low surface astigmatism having a surface power varying from that of the upper viewing zone to that of the lower viewing zone. The lower viewing zone is for a wearer's near vision tasks.

In Hasebe S., Jun J., Varnas S. R., Myopia control with positively aspherized progressive addition lenses: a 2-year, multicenter, randomized, controlled trial, Invest Ophthalmol Vis Sci. 2014; 55:7177-7188. DOI: 10.1167/iovs.12-11462, the effect of newly designed progressive spectacle lenses, which reduce both lag of accommodation and hyperopic defocus on the peripheral retina, on the progression of early-onset myopia, are evaluated. The progressive spectacle lenses have relative plus power in a peripheral zone of the lens compared with the central viewing zone, wherein power and surface astigmatism are distributed in a fashion to provide clear distance vision in the central viewing zone and clear near vision in a lower part of the peripheral zone. In addition, the peripheral zone provides a positive mean addition power in an upper portion of the lens intended as a stop signal for myopia progression. The region of the peripheral zone providing low astigmatism includes a near viewing zone connected to the central viewing zone via a nearly umbilic corridor. Further, the progressive spectacle lenses have a very short power progression corridor adapted for use with children or juveniles with full nominal addition being reached 14 mm below the fitting point. However, a positive aspherizing of the distance zone of the progressive spectacle lens with an astigmatic surface extension did not lead to a higher efficacy in controlling progression of myopia compared to a conventional progressive spectacle lens without such a positive aspherization.

WO 2013/134825 A1 discloses an ophthalmic lens element which includes an upper distance viewing zone and a lower near viewing zone. The upper distance viewing zone includes a central region with a first refractive power for clear distance vision and peripheral regions that are relatively positive in power compared to the first refractive power. The lower near viewing zone has a central region that is relatively positive in power compared to the first refractive power to account for accommodative lag. The powers of the peripheral regions of the lower near viewing zone are one of: i) equal to the power of the central region of the lower near viewing zone, ii) relatively positive in comparison to the power of the central region of the lower near viewing zone.

Further background to the present disclosure is discussed in CN 110 068 938 A, US 2004/008320 A1, and U.S. Pat. No. 6,390,623 B1.

Despite the advantages as implied by the above-mentioned progressive spectacle lenses, there is still room for further for improvements with respect to an increased preventive treatment for myopia in childhood, in particular under contemporary circumstances which are distinguished by an intensified use of computer devices.

SUMMARY

It is an objective of the present disclosure to provide a progressive spectacle lens, a method for producing a progressive spectacle lens, and a computer program comprising instructions which, when the program is executed by a computer, cause the computer to carry out the steps of the method for producing the progressive spectacle lens, which at least partially overcome the above-mentioned problems of the related art.

It is a particular objective of the present disclosure to correct a relatively hyperopic peripheral shift of the eyes of the wearer of the progressive spectacle lens during distance vision tasks when looking straight ahead, and, concurrently, to reduce an accommodative lag during both near vision tasks, such as reading, and viewing objects at intermediate viewing distances, such as a screen of a computer monitor.

This objective is achieved by a progressive spectacle lens, a method for producing a progressive spectacle lens, and a computer program comprising instructions which, when the program is executed by a computer, cause the computer to carry out steps of the method for producing the progressive spectacle lens having a central viewing zone, a lower viewing zone, and two peripheral vision zones. Exemplary embodiments, which can be implemented in an isolated fashion or in any arbitrary combination, are listed throughout the specification.

In a first aspect, the present disclosure relates to a progressive spectacle lens, wherein the progressive spectacle lens has a front surface and a back surface, wherein the front surface or the back surface is a progressive surface comprising:

a central viewing zone having a surface power providing a first refracting power for distance vision;

a lower viewing zone having a greater surface power than the central viewing zone providing a second refracting power corresponding to near vision, wherein the lower viewing zone is connected to the central viewing zone by a first progressing power region having a surface power varying from the surface power of the central viewing zone to the greater surface power of the lower viewing zone and having a corridor of low surface astigmatism;

two peripheral vision zones extending bilaterally from a vertical meridian of the progressive surface, each having a greater surface power than the central viewing zone providing a third refracting power at a prescribed field angle for correcting a peripheral hyperopic shift of a static eye looking straight ahead, wherein each peripheral vision zone is connected to the central viewing zone by a second progressing power region having a surface power varying from the surface power of the central viewing zone to the greater surface power of each peripheral vision zone and having a corridor of low surface astigmatism; and an upper viewing zone having a greater surface power than the central viewing zone providing a fourth refracting power corresponding to intermediate vision, wherein the upper viewing is connected to the central viewing zone by a third progressing power region having a surface power varying from the surface power of the central viewing zone to the surface power of the upper viewing zone and having a corridor of low surface astigmatism.

Based on standard ISO 13666:2019, Ophthalmic optics-Spectacle lenses-Vocabulary, also referred to herein as the "standard," Section 3.5.2, the term "spectacle lens" relates to an optical lens which is used for determining and/or correcting the at least one ocular aberration of an eye of a wearer, wherein the spectacle lens is carried in front of the eye of the wearer. Instead of the term "wearer," a different term, such as "subject," "person," "test person" or "user," may also be applicable. Further, the Standard, Section 3.7.8, defines the term "progressive spectacle lens" as a particular kind of spectacle lens having a progressive surface that comprises at least two reference points for focal power, generally designed to provide correction for presbyopia and clear vision from distance to near. In particular, the progressive spectacle lens has a primary reference point also denoted as "DRP" and a secondary reference point also denoted as "near reference point" or "NRP."

Further, the term "ocular aberration" refers to a difference between a surface of an ideal optical wavefront and a surface of an actual optical wavefront which is determined for the eye of the wearer. Herein, the term "optical wavefront" relates to a surface that is perpendicular to a ray along which light propagates. In particular, the ocular aberration within a typical human population, usually, comprises at least one second-order sphero-cylindrical focus error, also denoted as "refractive error." For describing a spherocylindrical lens which is designed for correcting a sphero-cylindrical focus error, various approaches are possible. As defined in the standard, Section 3.6.6, the term "spherocylindrical lens" refers to a spectacle lens having one spherical surface and one cylindrical surface. Further, the spherocylindrical lens is defined, according to Section 3.13.1, as a spectacle lens which combines a paraxial, parallel beam of light in two individual, mutually perpendicular focal lines, whereby the spectacle lens has a refracting power only in two meridians. As generally used, the term "refracting power" refers to a measure of a degree to which a spectacle lens converges or diverges incident light. Further, the term "vertex power" is, according to Section 3.10.7, defined as a reciprocal value of the width of the paraxial section. As further defined in Section 3.2.12 and 3.13.2, the term "meridian" relates to one of two perpendicular planes of the spectacle lens having an astigmatic effect being parallel to the two focal lines. Further, the terms "astigmatic effect" or "astigmatic power" correspond to an "astigmatic difference" which is defined in Section 3.13.6 as a difference between the value of the vertex power in the horizontal meridian and the value of the refracting power in the vertical meridian. As further generally used, the term "surface astigmatism" refers to a measure of a degree to which a curvature of the spectacle lens varies among intersecting planes that are normal to the surface of the spectacle lens at a point on the surface of the spectacle lens. Further, the "cylindrical power" refers, according to Section 3.13.7, to an algebraic difference between the refractive values of the meridians, wherein the refractive value of a particular meridian being used as a reference is subtracted from the refractive value of the other meridian, while the "cylinder axis" indicates according to Section 3.13.8 the direction of the principal meridian of a spectacle lens whose vertex power is used as reference. As further defined in Section 3.10.4, the term "surface power" refers to local ability of a finished surface to change the vergence of a bundle of rays incident at the surface, wherein the surface power is determined from at least one radius of a surface and the refractive index of the optical material as used for the progressive spectacle lens.

The progressive spectacle lens has a lens body comprising a front surface and a back surface, wherein the back surface is facing the eye of the wearer while the front surface is firstly hit by an incident light beam impinging on the progressive spectacle lens. In general, two types of progressive lenses exist, i.e., a first type having a progressive surface on the front surface of the optical lens and a prescription surface selected from a spherical surface or a toric surface on the back surface, and a second type having a spherical front surface, while the back surface combines the progressive surface and the prescription surface. The first type is usually cast as a semi-finished progressive surface, whereinafter the prescription surface is applied to the back surface. The second type is usually cast as a spherical puck having a spherical front surface, whereinafter the back surface is treated with a free form generator and polisher in order to obtain a complex surface combining the progressive surface and the toric surface.

The progressive spectacle lens may be formulated from any suitable material, in particular from a polymeric material. Herein, the polymeric material may be of any suitable type, especially of a thermoplastic or thermoset material. Specifically, a material of a diallyl glycol carbonate type, e.g., CR-39 (PPG Industries) may be used. Herein, the polymeric article may be formed from cross-linkable polymeric casting compositions. Further, at least one of the front surface and the back surface may comprise at least one addition used in casting compositions such as inhibitors, dyes including thermochromic and photochromic dyes, polarizing agents, UV stabilizers, or materials capable of modifying refractive index. Further, the progressive spectacle lens may comprise additional coatings to at least one of the front surface or back surface, in particular electrochromic coatings. The front surface may, further, comprise at least one of an anti-reflective (AR) coating or an abrasion resistant coating. For further details, reference can be made to EP 2 069 854 B1.

According to the present disclosure, the progressive surface has a central viewing zone. As generally used, the term "viewing zone" refers to a portion of the progressive surface which is designated for providing refracting power for a particularly selected kind of vision. As generally used, both terms "central viewing zone" and "distance viewing zone" refer to a portion of the progressive surface which is located around the center of the progressive surface and which is designated for providing refracting power for distance vision, specifically for providing foveal vision for on-axis viewing of the wearer of the progressive spectacle lens. The refracting power as provided by the central viewing zone may, typically, be a prescribed power that corresponds with an optical correction for the distance vision requirements of the wearer. For a purpose of correcting myopia, the central viewing zone exhibits a negative power in order to bring an image to the retina of the wearer of the progressive spectacle lens from an uncorrected position in front of the retina. In particular, the central viewing zone may cover an area of the progressive surface which corresponds with typical eye rotations of the wearer.

Further according to the present disclosure, the progressive surface comprises four different stable addition power regions which are located in peripheral portions of the progressive surface of the progressive spectacle lens around the central viewing zone in a manner that they surround the central viewing zone. As generally used, the term "peripheral" refers to a portion of the progressive surface outside the central viewing region. According to the present disclosure, the peripheral portions provide, throughout the peripheral portions, addition power relative to the first refracting power of the central viewing zone. As generally used, the term "addition power" refers to a portion of refracting power which is provided in addition to the refracting power as provided by the central viewing zone.

The lower viewing zone is located along a lower portion of a vertical meridian of the progressive surface and provides a second refracting power corresponding to near vision. Therefore, the lower viewing zone may also be denoted as a "near viewing zone." Herein, the second refracting power provides a first addition power of +1.00 D to +4.00 D, typically of +1.50 D to +2.50 D, relative to the first refracting power of the central viewing zone, thus providing a greater surface power than the central viewing zone. As generally used herein, the term "greater" indicated that the surface power of the respective viewing zone exceeds the surface power of the central viewing zone. In particular, the lower viewing zone may reduce the need for the wearer to tilt the head during near vision tasks, such as reading, and thus may make the lens more comfortable to wear. Further, the lower viewing zone may reduce accommodative demand imposed on the eye of the wearer for the near vision tasks, such as reading. In particular, the lower viewing zone may assist juvenile wearers in reducing their accommodative demand during near viewing tasks, which has been shown to have a non-negligible effect on the retardation of the progression of myopia.

Both peripheral vision zones are extending bilaterally from the vertical meridian of the progressive surface. As indicated by the term "bilaterally," both peripheral vision zones are located along a horizontal meridian of the progressive surface in a symmetrical manner along the horizontal meridian of the progressive surface with respect to a center of the progressive surface, specifically a first peripheral vision zone in a nasal direction and a second peripheral vision zone in a temporal direction of the progressive surface. Both peripheral vision zones are designed for providing a third refracting power at a prescribed field angle which is devised to correct a peripheral hyperopic shift of a static eye looking straight ahead. Herein, the third refracting power provides a second addition power of +1.00 D to +3.50 D, typically of +1.50 D to +2.00 D, relative to the first refracting power of the central viewing zone. As a result, the first addition power may exceed the second addition power by +0.50 D or less, in particular the first addition power may equal the second addition power.

In particular accordance with the present disclosure, the upper viewing zone is located along an upper portion of the vertical meridian of the progressive surface, thereby pointing to a top of the progressive surface. Herein, the upper viewing zone is designated for providing a fourth refracting power corresponding to intermediate vision. As a result, the upper viewing zone may improve viewing of objects at intermediate viewing distances, such as a screen of a computer monitor. Herein, the fourth refracting power provides a third addition power of +0.50 D to +2.00 D, typically of +0.75 D to +1.50 D, relative to the first refracting power of the central viewing zone. As a result, both the first addition power and the second addition power may exceed the third addition power.

Further, the progressive surface comprises a set of progressing power regions. As used herein, the term "progressing power region" refers to a region having a positive gradient of surface power which is located on the progressive surface and which is formed as a "corridor" by connecting the central viewing zone and each of the lower viewing zone, the two peripheral vision zones, and the upper viewing zone. As generally used, the term "corridor" refers to a portion of the progressive surface which is designated for connecting at least two individual viewing zones which are located on different parts of the progressive surface. According to the present disclosure, each progressing power region has increasing addition power with increasing distance from the center of the progressive surface, wherein the addition power increases until the respective addition power of the corresponding progressing power region is fully reached. As described below in more detail, each corridor forming a progressing power region on a portion of the progressive surface, simultaneously, exhibits a low surface astigmatism, wherein the term "low surface astigmatism" refers a low degree of astigmatic power at the respective portion of the progressive surface that amounts to less than +0.25. In contrast hereto, a higher surface astigmatism may exhibit an astigmatic power of up to +2.00 D.

A conventional progressive lens for presbyopes may comprise an intermediate viewing zone which is located in a progression zone between the distance viewing zone and the near viewing zone. The distance from the fitting cross (FC) in the central viewing zone to the near reference point (NRP) in the lower viewing zone is quite short in the progressive surface as comprised by the progressive spectacle lens according to the present disclosure. As a result, too little space remains to fit an intermediate viewing zone between the fitting cross and the near reference point. Consequently, the intermediate viewing zone is now comprised by the upper viewing zone which is located in an area above the distance viewing zone, whereby the distance from the fitting cross to the upper viewing zone is shorter than the distance from the fitting cross to the near viewing zone. Herein the viewing of a monitor could, further, be improved by adjusting a height of the monitor, in particular slightly upwards, and/or by exerting a slight tilt of the head down when viewing the monitor in front of the wearer.

More particular, both the first addition power and the second addition power may be fully reached at a first distance from the center of the progressive surface, wherein the first distance may be of 12 mm to 20 mm, typically of 15 mm to 17 mm, in particular of 16±0.1 mm. Similarly, the third addition power of the upper viewing zone may be fully reached at a second distance from the center of the progressive surface, wherein the first distance may, typically, exceed the second distance, wherein the second distance may be of 7 mm to 10 mm, typically of 8 mm to 9 mm, in particular of 8.5±0.1 mm. However, further values may also be feasible.

Further, the progressive surface may comprise a set of blending regions. As generally used, the term "blending region" refers to an area of the progressive surface which has a non-prescribed surface mean power that only provides minimal visual utility. As used herein, the term "blending region" may, in particular, refer to a region which is located between two adjacent progressing power regions.

Further, the progressive spectacle lens comprises a particular distribution of surface astigmatism over the progressive surface. Herein, the low surface astigmatism having an astigmatic power of less than +0.25 D is present in the central viewing zone, subject to the limitations imposed by the international standards on the power at the DRP, and is extending from the central viewing zone to each of the lower viewing zone, the two peripheral vision zones, and the upper viewing zone through each of the progressing power regions that connect the central viewing zone and the corresponding lower viewing zone, the two peripheral vision zones, and the upper viewing zone, respectively. In contrast hereto, a higher surface astigmatism, such as having an astigmatic power of up to +2.00 D, may be present in the blending regions which are located between two adjacent progressing power regions.

In a further aspect, the present disclosure relates to a series of progressive spectacle lenses, wherein a subsequent progressive spectacle lens in the series has a range of addition powers wherein at least one of those addition powers is higher than the corresponding addition power of a preceding progressive spectacle lens in the series, while the other addition powers are equal or higher than the corresponding addition powers of the preceding spectacle lens in the series. In particular, the addition power of the lower viewing zone for near vision may vary, such as in a conventional progressive lens series, with increments of +0.25 D, whereas the other addition powers in the series may be maintained at the same level or incremented by +0.25 D, especially depending on peripheral refraction needs and intermediate vision needs, respectively. As a particular advantage of the increments of the progressive spectacle lenses in a series, the preceding progressive spectacle lens in the series may, in particular, be used at an earlier stage of a myopia control treatment, while the subsequent progressive spectacle lens in the series may, in particular, be used at a later stage of the myopia control treatment, specifically, in order to introduce a boost to the plus power which may be advantageous to maintain the efficacy of the myopia control treatment during a later stage of the treatment.

In a further aspect, the present disclosure relates to a method for producing a progressive spectacle lens as disclosed elsewhere herein. The method according to the present disclosure comprises the following steps a) and b), which may, typically, be performed in the given order commencing with step a) and continuing with step b), wherein, depending on the selected production method, both steps may also at least partially be performed in a simultaneous manner. In addition, further steps, whether disclosed herein or not, may, additionally, be performed.

The steps of the present method for producing a progressive spectacle lens are as follows:

(a) determining, for a wearer of the progressive spectacle lens, a first value for a first refracting power for distance vision, a second value for a second refracting power corresponding to near vision, a third value for a third refracting power for correcting a peripheral hyperopic shift of a static eye looking straight ahead; and a fourth value for a fourth refracting power corresponding to intermediate vision; and (b) producing the progressive spectacle lens by processing at least one lens blank using the first value, the second value, the third value and the fourth value of the optical correction, wherein the progressive spectacle lens has a front surface and a back surface, wherein the front surface or the back surface is a progressive surface as described elsewhere herein.

According to step (a), the respective values for the corresponding refracting powers are determined, in particular, by using the knowledge of the person skilled in the art. Based on the first value, the second value, the third value and the fourth value of the optical correction, the progressive spectacle lens is, subsequently, produced according to step (b) by processing at least one lens blank as well-known to the person skilled in the art.

In general, the method according to the present disclosure can be performed in a fashion in which a lens blank may be provided and, subsequently, be grinded, such as by using a grinding device, in order to produce a desired progressive spectacle lens by using the first value, the second value, the third value and the fourth value of the optical correction as used for compensating the at least one ocular aberration in the eyes of the wearer.

However, in an exemplary embodiment, the method according to the present disclosure may be a computer-implemented method. As generally used, the term "computer-implemented method" refers to a method which involves a programmable apparatus, specifically a computer, a computer network, or a readable medium carrying a computer program, whereby at least one method step, typically all method steps, is performed by using at least one computer program. For this purpose, the computer program code can be provided on a data storage medium or a separate device such as an optical storage medium, e.g., on a compact disc, directly on a computer or a data processing unit, in particular a mobile communication device, specifically a smartphone or a tablet, or via a network, such as an in-house network or the internet. The present method can, thus, be performed on a programmable unit which is configured for this purpose, such as by providing a particular computer program.

Thus, in a further aspect, the present disclosure refers to a computer program which, when the program is executed by a computer, cause the computer to carry out the steps of the method for producing the progressive spectacle lens according to the present disclosure. For this purpose, the computer program may comprise instructions provided by means of a computer program code which are capable of performing any or all of the steps of the method as described elsewhere herein and, thus, to produce a spectacle lens for the eyes of a wearer when implemented on a computer or a data processing unit. Herein, the computer program code may be provided on a data storage medium or a separate device such as an optical storage medium, e.g., on a compact disc, directly on a computer or a data processing unit, in particular a mobile communication device, specifically a smartphone or a tablet, or via a network, such as an in-house network or the internet.

For further details concerning the method for producing the progressive spectacle lens and the related computer program, reference may be made to the progressive spectacle lens as disclosed elsewhere herein.

The progressive spectacle lens, the method for producing the progressive spectacle lens and the related computer program exhibit various advantages with respect to the related art. In particular, the progressive spectacle lens may, in particular, be used for inhibiting a myopigenic stimulus during both distance vison and near vision. This use of the progressive spectacle lens according to the present disclosure is in particular contrast to the progressive spectacle lens as described by Hasebe S. et al., see above, in which attempting to positively aspherize the distance zone of the progressive spectacle lens with an astigmatic surface extension did not show a higher efficacy in controlling progression of myopia compared to a conventional progressive spectacle lens without such a positive aspherization.

In contrast to the lens design concepts as claimed in WO 2013/134825 A1, the spectacle lens according to the present disclosure does not comprise lower peripheral zones having mean power equal to or higher than the near zone power. Rather, the present spectacle lens has considerably lower mean powers in those areas than the power of the near zone.

Further, the spectacle lenses of WO 2013/134825 A1 exhibit the region from the distance point to the near point as a single channel of low astigmatism having progressing power, wherein discontinuous inserts in the peripheral areas or a blending of those areas of high plus power through blending zones with high astigmatism are proposed. In contrast hereto, the present spectacle lens has 4 channels of low astigmatism transitioning smoothly from one power to another until they reach areas of stable power. Further, WO 2013/134825 A1 does not disclose the upper viewing zone for intermediate vision.

Even in view of the further documents U.S. Pat. No. 8,540,365 B2, U.S. Pat. No. 8,833,936 B2 or U.S. Pat. No. 6,390,623 B1, the skilled person would not regard it as a normal design procedure to implement low surface astigmatism profiles in order to connect different viewing zones of D1. All mentioned documents implement the low surface astigmatism profiles along one axis, a vertical axis or a horizontal axis. In contrast hereto, our disclosure simultaneously implements these channels along two axes, which are almost perpendicular to each other. Only this implementation allows solving the problem in ophthalmic lens design of providing plus power with low astigmatism in 4 different directions to cater for different requirements of both foveal and peripheral vision in young progressing myopic wearers.

As used herein, the terms "have," "comprise" or "include" or any arbitrary grammatical variations thereof are used in a non-exclusive way. Thus, these terms may refer to both a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

As further used herein, the terms "preferably," "more preferably", "particularly", "more particularly", or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in this way with other features of the disclosure.

Further optional features and embodiments of the present disclosure are disclosed in more detail in the subsequent description of exemplary embodiments, typically in conjunction with the dependent claims. Therein, the respective optional features of the dependent claims may be implemented in an isolated fashion as well as in any arbitrary feasible combination, as the skilled person will realize. It is emphasized here that the scope of the disclosure is not restricted by the exemplary embodiments.

BRIEF DESCRIPTION OF THE DRAWINGS

The disclosure will now be described with reference to the drawings wherein.

DESCRIPTION OF EXEMPLARY EMBODIMENTS

Figure 1A:
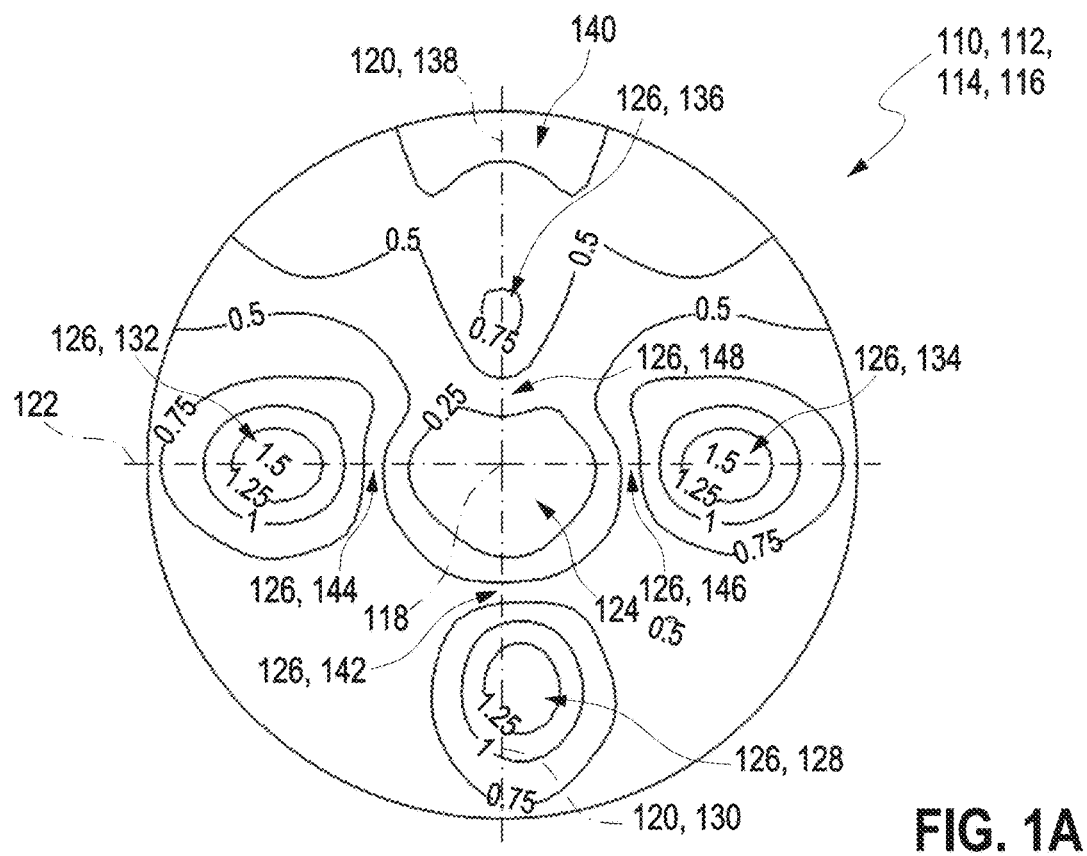
FIGS. 1A and 1B illustrate a contour plot of a surface mean power (FIG. 1A) and a surface astigmatism (FIG. 1B) for an exemplary embodiment of a progressive spectacle lens according to the present disclosure.

FIG. 1A illustrates a contour plot 110 of a surface mean power 112 for an exemplary embodiment of a progressive spectacle lens 114 according to the present disclosure. As described above and below in more detail, the progressive spectacle lens 114 as presented herein can, typically, be used for myopia control, especially with children. The progressive spectacle lens 114 has a lens body which may be transparent, or at least partly transparent, to an incident light beam in order to be able to correct at least one ocular aberration of the eye of a wearer. The lens body of the progressive spectacle lens 114 has a front surface and a back surface, wherein the back surface is facing the eye of the wearer while the front surface is firstly hit by the incident light beam impinging on the progressive spectacle lens 114. Herein, either the front surface or the back surface, typically the back surface, of the progressive spectacle lens 114 may combine a progressive surface 116 as described below in more detail and a prescription surface, which may include a toric component to correct the wearer's astigmatism of the eye, while the other surface (not depicted here) may be a spherical surface designated for providing distant viewing in a specific distance. As further illustrated in FIG. 1A, the progressive surface 116 may, typically, assume a circular or a slightly oval form, having a center 118 in which a vertical meridian 120 and a horizontal meridian 122 intersect each other. Herein, a fitting cross (FC) may be located at the center 118. Each contour plot 110 as displayed in FIGS. 1A to 4B shows a distribution of a respective variables over a diameter of 50 mm, which corresponds to a size of a typical children's frame or juvenile's frame in an approximate fashion.

As schematically depicted in FIG. 1A, the progressive surface 116 has a central viewing zone 124, which is located around the center 118 of the progressive spectacle lens 114. The central viewing zone 124 is designated for providing a first refracting power, in particular over an area that corresponds with typical eye rotations of the wearer, wherein the first refracting power may, typically, be adjusted to be suitable for distance vision tasks of the wearer. Further, the progressive surface 116 has peripheral portions 126 which surround the central viewing zone 124 and which are adjusted to provide, throughout the peripheral portions 126, an addition power relative to the first refracting power as provided by the central viewing zone 124.

Firstly, a lower viewing zone 128 is located along a lower portion 130 of the vertical meridian 120 within the peripheral portions 126 of the progressive surface 116. The lower viewing zone 128 is designated for providing a first addition power which is suitable for near vision tasks of the wearer, such as reading or looking at a keyboard of a computer. In the exemplary embodiment of the progressive surface 116, as shown in FIG. 1A, the first addition power provided by the first stable addition power region 128 assumes value of about +1.50 D relative to the first refracting power as provided by the central viewing zone 124.

Further, two peripheral vision zones 132, 134 extend bilaterally from the horizontal meridian 122 within the peripheral portions 126 of the progressive surface 116, one in a temporal direction and the other in a nasal direction of the progressive surface 116, respectively. Herein, both peripheral vision zones 132, 134 are designated for providing a second addition power at a prescribed field angle which is devised to correct a peripheral hyperopic shift of a static eye looking straight ahead. In the exemplary embodiment of the progressive surface 116 as shown in FIG. 1A, the addition power of both peripheral vision zones 132, 134 assumes a value of about +1.50 D which is similar to that of the first stable addition power region 128.

According to the present disclosure, an upper viewing zone 136 is located along an upper portion 138 of the vertical meridian 120 within the peripheral portions 126 of the progressive surface 116, thus pointing to a top 140 of the progressive surface 116. Herein, the upper viewing zone 136 is designated for providing a third addition power which is devised to reduce the accommodative lag during intermediate vision. As a result, the upper viewing zone 136 may improve viewing of objects at intermediate viewing distances, such as a screen of a computer monitor. In the exemplary embodiment of the progressive surface 116 as shown in FIG. 1A, the third addition power of the upper viewing zone 136 assumes a value of about +0.75 D relative to the first refracting power as provided by the central viewing zone 124. This value is considerably smaller compared to both the first addition power of about 1.50 D provided by the lower viewing zone 128 and the second addition power of also about 1.50 D provided by the peripheral vision zones 132, 134.

As further schematically depicted in FIG. 1A, a progression of the surface mean power 112 from the center 118 of the progressive surface 116 to the first addition power of about +1.50 D in the lower viewing zone 128 and to the second addition power of also about +1.50 D in the peripheral vision zones 132, 134 is fully reached at a first distance of 16±0.1 mm from the center 118 of the progressive surface 116, whereas the third addition power of about +0.75 D in the upper viewing zone 136 is, in this exemplary embodiment, already fully reached at a second distance of about 8.5±0.1 mm from the center 118 of the progressive surface 116.

As a result of this exemplary arrangement, a progression length of a first progressing power region 142 connecting the central viewing zone 124 to the lower viewing zone 128, of a second progressing power region 144 connecting the central viewing zone 124 to the peripheral vision zone 132, and of a third progressing power region 146 connecting the central viewing zone 124 to the further peripheral vision zone 134 considerably exceeds the progression length of a fourth progressing power region 148 connecting the central viewing zone 124 to the upper viewing zone 136. In particular, the progression lengths of the first progressing power region 142 and of the fourth progressing power region 148 as arranged in this fashion may be beneficial to increase compliance with a use of the lower viewing zone 128 for near vision and the upper viewing zone 136 for intermediate vision.

Figure 1B:
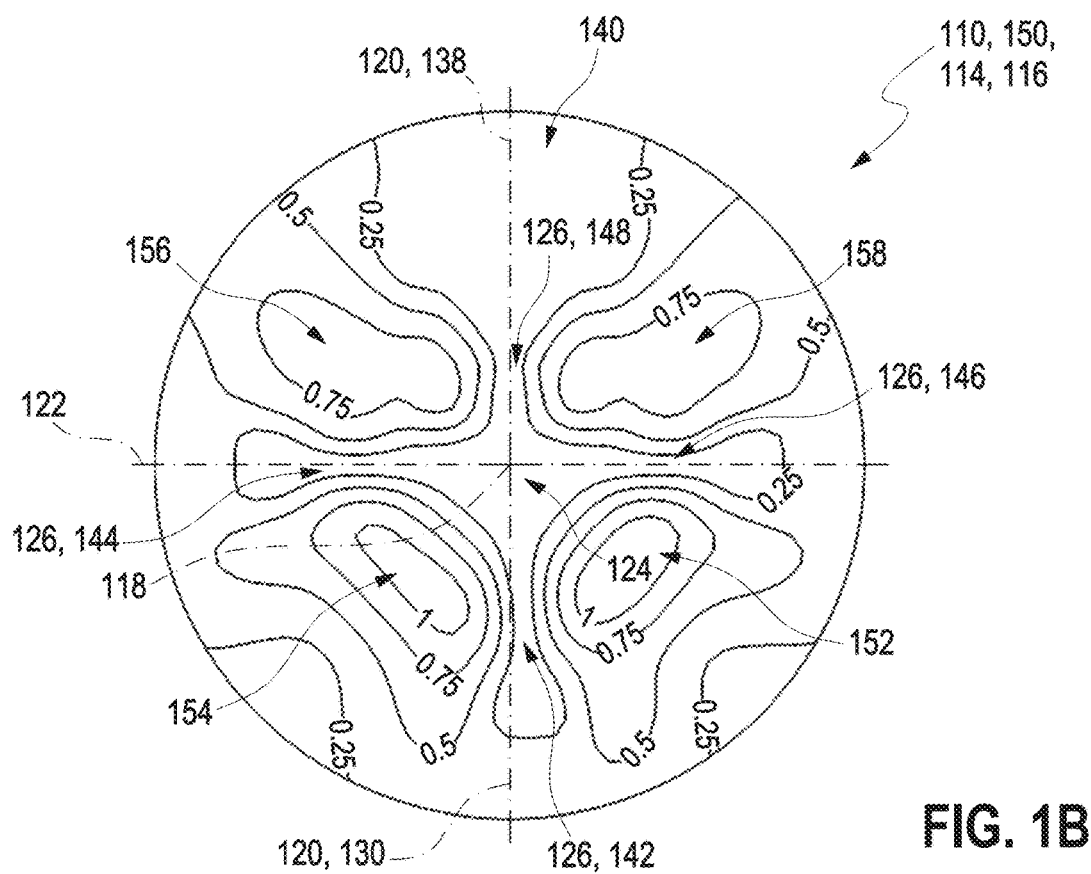

FIG. 1B illustrates the contour plot 110 of surface astigmatism 150 for the same exemplary embodiment of the progressive surface 116 of the progressive spectacle lens 114 as depicted in FIG. 1A. Herein, it is schematically depicted that each progressing power region 142, 144, 146, 148 as defined above has a low surface astigmatism, in which an astigmatic power of the low surface astigmatism may be less than +0.25 D, typically close to zero.

As further depicted in FIG. 1B, the peripheral portions 126 of the progressive surface 116 may, in addition, comprise blending regions 152, 154, 156, 158 of high surface astigmatism, wherein each blending region 152, 154, 156, 158 may be located between two of the adjacent progressing power regions 142, 144, 146, 148. In the exemplary embodiment of the progressive surface 116 as shown in FIG. 1B, the astigmatic power of each blending region 152, 154, 156, 158 is between +0.75 D to +1.25 D. In this exemplary embodiment, the astigmatic power of those blending regions 152, 154 which adjoin the lower viewing zone 128 may, especially, exhibit a higher astigmatic power of about +1.00 D to +1.25 D compared to the astigmatic power of about +0.75 D to +1.00 D of the other blending regions 156, 158 which adjoin the upper viewing zone 136.

Figure 2A:
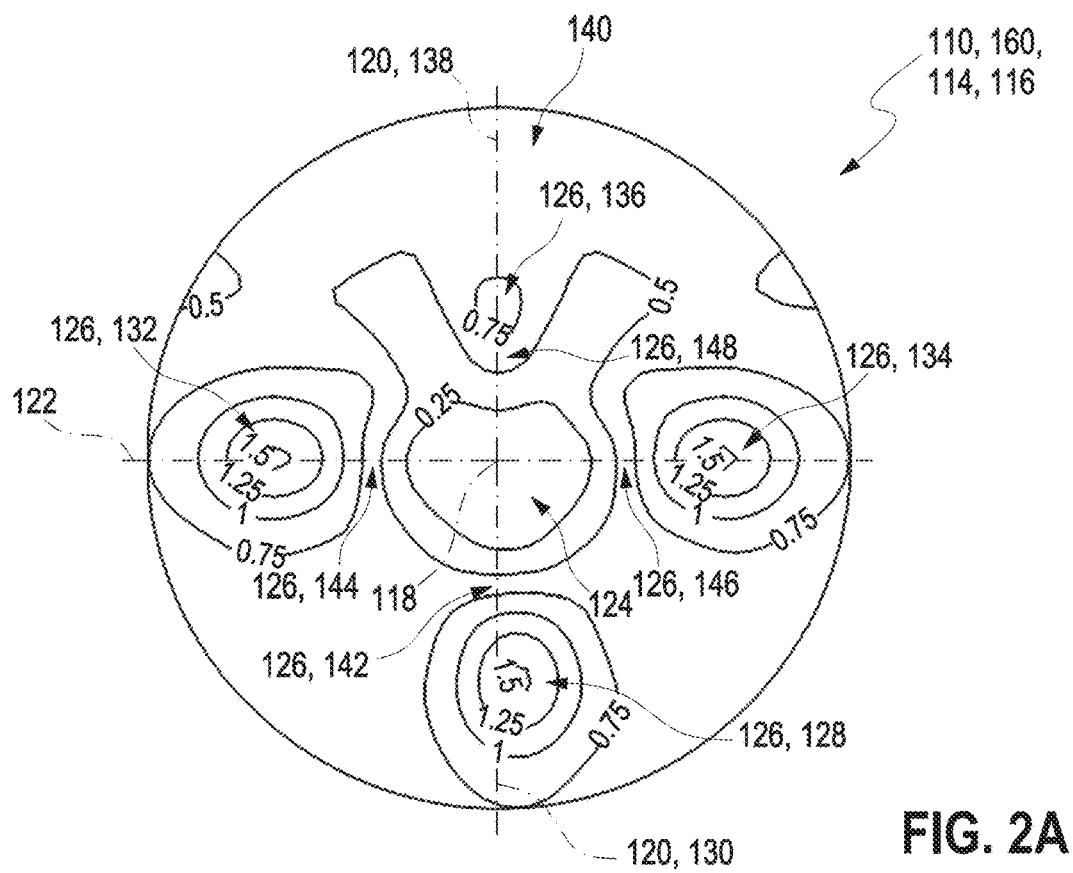
FIGS. 2A and 2B illustrate the contour plot of an optical mean power (FIG. 2A) and an optical astigmatism (FIG. 2B) for the exemplary embodiment of the progressive spectacle lens as depicted in FIGS. 1A and 1B.

FIG. 2A illustrates the contour plot 110 of an optical mean power 160 as distributed over the progressive surface 116 of the exemplary embodiment of the progressive spectacle lens 114 as schematically depicted in FIG. 1A. Herein, values of the optical mean power 160 have been obtained by ray tracing. For this purpose, an analysis of the optical mean power 160 as distributed over the progressive surface 116 has been performed by a simulation of a process of measuring the progressive spectacle lens 114 using an ophthalmic instrument, in particular a lensmeter or a lensometer, especially a vertometer or a focimeter, specifically a Humphrey Lens Analyzer, on the progressive surface 116. For this purpose, the progressive spectacle lens 114 is positioned with a measurement point on an optical axis of the ophthalmic instrument, wherein the progressive surface 116 is placed flush against a measurement aperture. Parallel light on a side of the progressive spectacle lens 114 opposite to the measurement aperture is refracted through the progressive spectacle lens 114, whereby a resulting vergence of a ray passing directly through the measurement aperture is determined for obtaining the respective value of the optical mean power 160. Hereby, a configuration has been used in which the ray is parallel to the optical axis of the ophthalmic instrument.

Figure 2B:
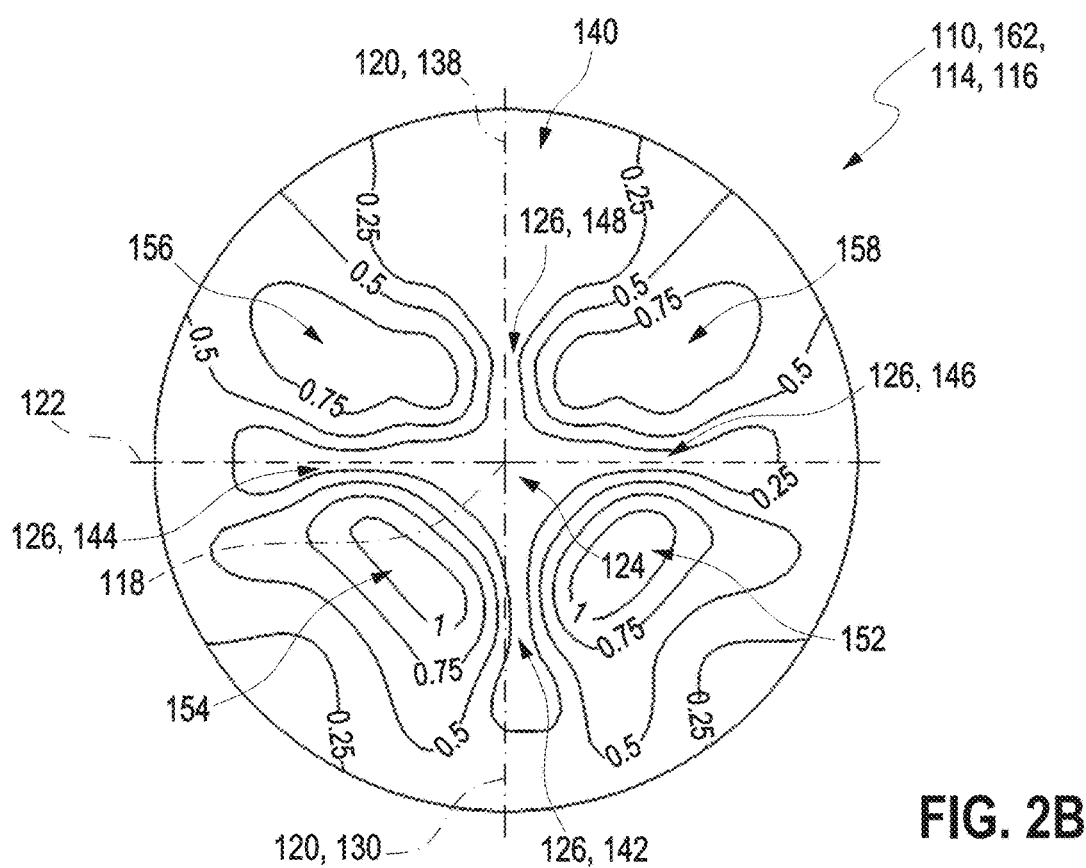

FIG. 2B illustrates the contour plot 110 of an optical astigmatism 162 as distributed over the progressive surface 116 of the exemplary embodiment of the progressive spectacle lens 114 as schematically depicted in FIG. 1B. Herein, values of the optical mean astigmatism 162 have been obtained by ray tracing in a similar fashion as in FIG. 1A with respect to the optical mean power 160.

Figure 3A:
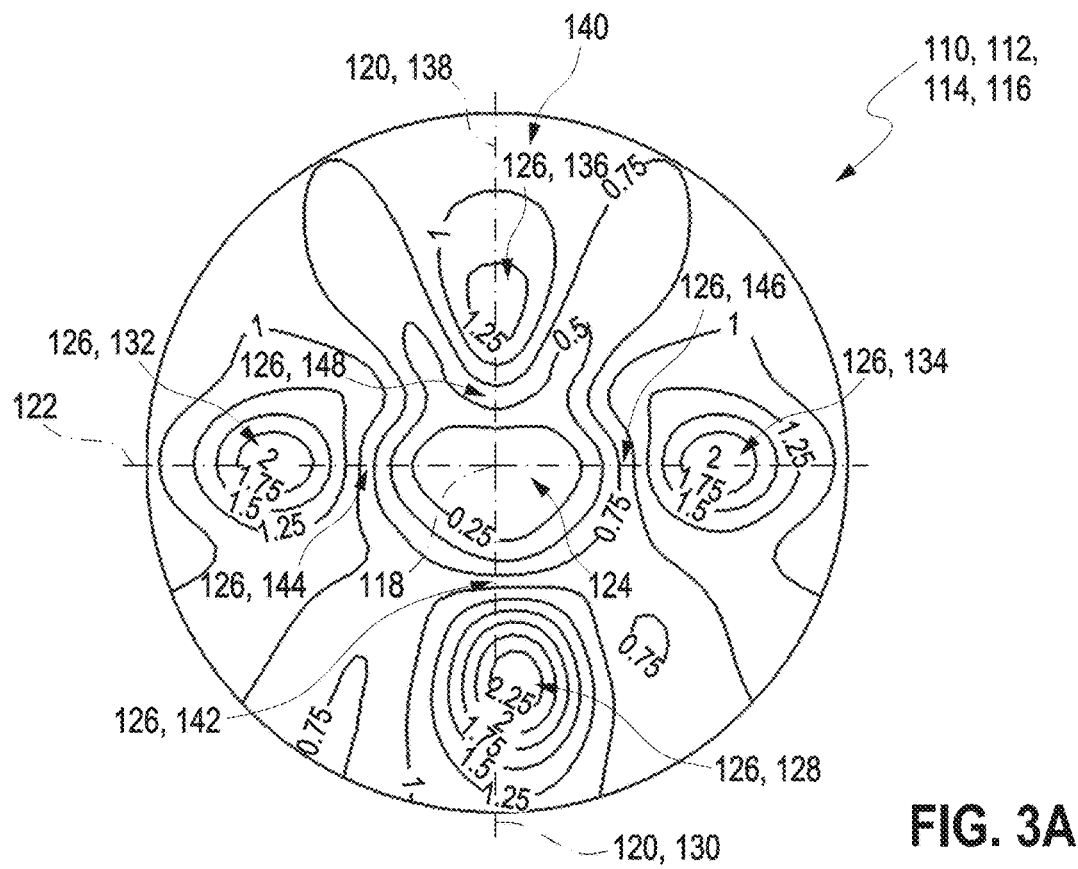
FIGS. 3A and 3B illustrate the contour plot of the surface mean power (FIG. 3A) and the surface astigmatism (FIG. 3B) for a further exemplary embodiment of a progressive spectacle lens according to the present disclosure.
Figure 3B:
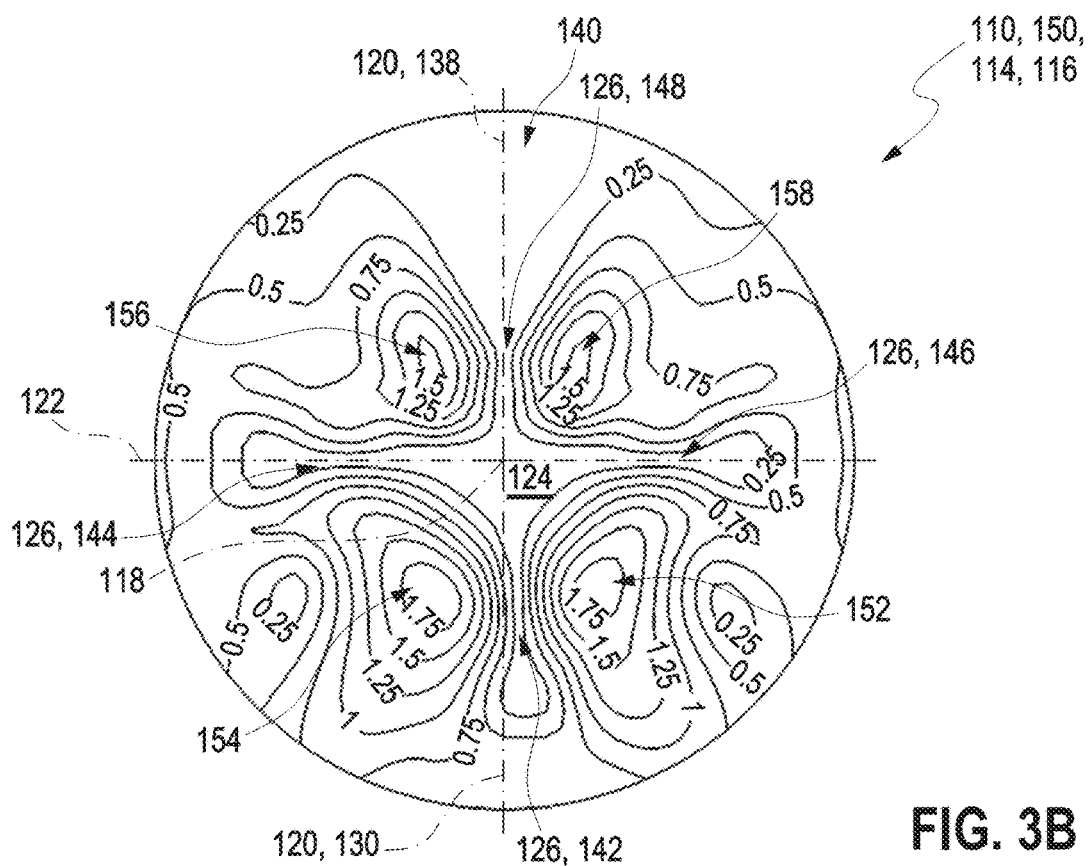

FIG. 3A illustrates the contour plot 110 of the surface mean power 112 for a further exemplary embodiment of the progressive surface 116 of the progressive spectacle lens 114 according to the present disclosure while FIG. 3B illustrates the contour plot 110 of the surface astigmatism 150 for the same further exemplary embodiment of the progressive surface 116 of the progressive spectacle lens 114 as depicted in FIG. 3A.

Figure 4A:
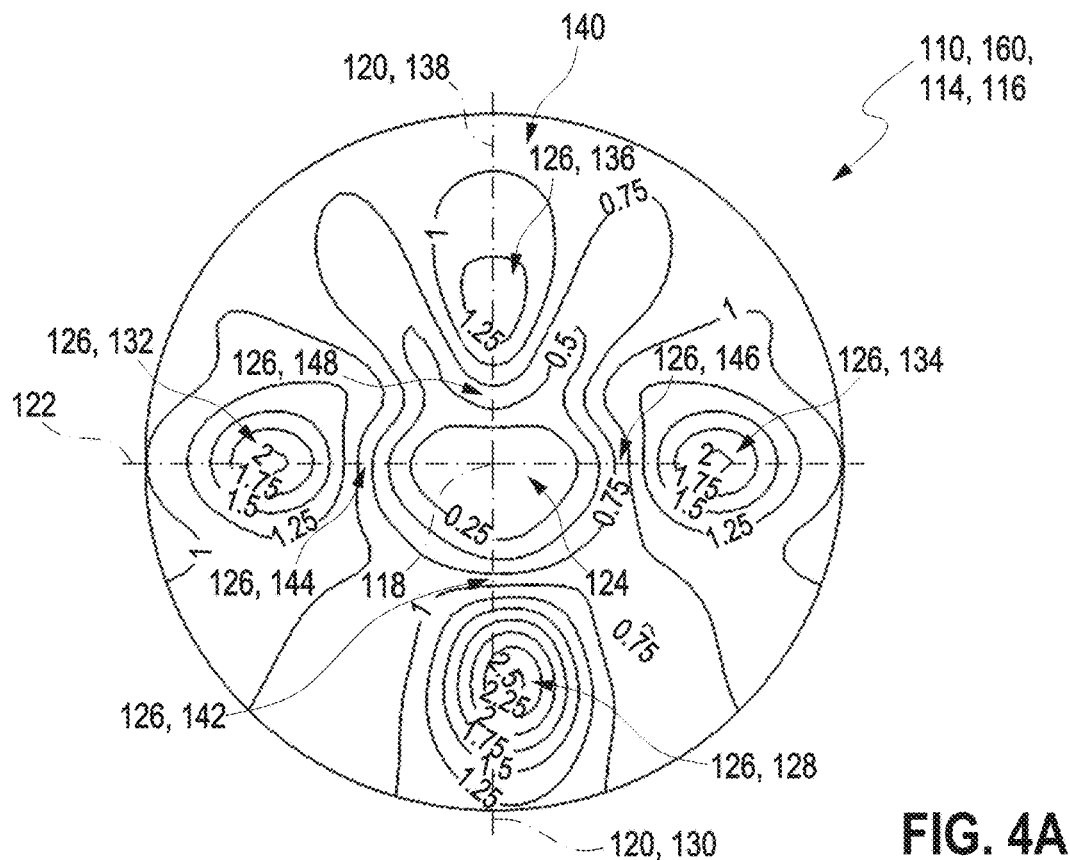
FIGS. 4A and 4B illustrate the contour plot of the optical mean power (FIG. 4A) and the optical astigmatism (FIG. 4B) for the further exemplary embodiment of the progressive spectacle lens as depicted in FIGS. 3A and 3B.
Figure 4B:
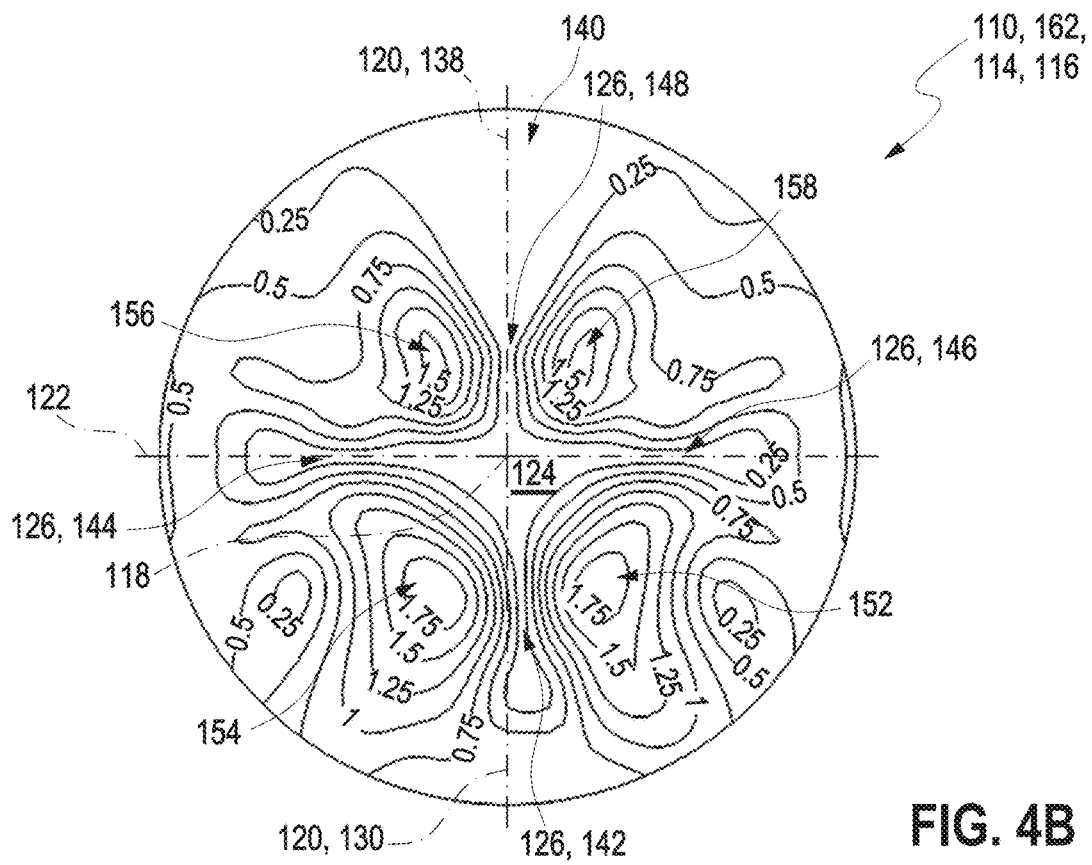

FIG. 4A illustrates the contour plot 110 of the optical mean power 160 and FIG. 4B the contour plot 110 of the optical astigmatism 162 both as distributed over the progressive surface 116 of the exemplary embodiment of the progressive spectacle lens 114 as schematically depicted in FIGS. 3A and 3B, respectively. For further details with respect to determining the optical mean power 160 and the optical astigmatism 162, reference can be made to the description of FIG. 2A above.

In the further exemplary embodiment of FIG. 3A, the progressive surface 116 has higher addition powers compared to the exemplary embodiment of the progressive surface 116 as depicted in FIG. 1A. In this exemplary embodiment of FIG. 3A, the first addition power in the lower viewing zone 128 along the vertical axis 120 assumes a value of about +2.50 D, while the second addition power in the peripheral vision zones 132, 134 along the horizontal axis 122 assumes a value of about +2.00 D, and while the third addition power in the upper viewing zone 136 assumes a value of about +1.25 D, each in addition to the first refracting power as provided by the central viewing zone 124 of the progressive surface 116.

Consequently, the progressive surface 116, as depicted in FIGS. 3A, 3B, 4A, and 4B, could be considered as another progressive spectacle lens in a series of progressive spectacle lenses 114 with respect to the progressive spectacle lens 114 as depicted in FIGS. 1A, 1B, 2A, and 2B.

As a result of this particularly typical arrangement, the progressive spectacle lens 114 as depicted in FIGS. 1A, 1B, 2A, and 2B may, in particular, be used at an earlier stage of a myopia control treatment, whereas the progressive spectacle lens 114 as schematically depicted in FIGS. 3A, 3B, 4A, and 4B may, in particular, be used at a later stage of the myopia control treatment, specifically, in order to introduced a boost to the plus power which may, be advantageous to maintain the efficacy of the myopia control treatment during the later stage of the myopia control treatment.

Figure 5:
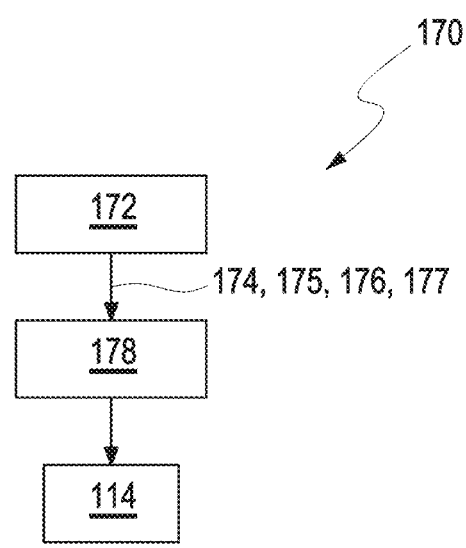
FIG. 5 illustrates an exemplary embodiment of the method for producing the progressive spectacle lens according to the present disclosure.

FIG. 5 illustrates an exemplary embodiment of the method 170 for producing the progressive spectacle lens 114 according to the present disclosure.

In a determining step 172 according to step a),
  a first value 174 for a first refracting power for distance vision;
  a second value 175 for a second refracting power corresponding to near vision;
  a third value 176 for a third refracting power for correcting a peripheral hyperopic shift of a static eye looking straight ahead; and
  a fourth value 177 for a fourth refracting power corresponding to intermediate vision are determined.

In a producing step 178 according to step b), the progressive spectacle lens 114 as described elsewhere herein is produced by processing at least one lens blank by using the first value 174, the second value 175, the third value 176 and the fourth value 177 of the optical correction. As a result, the progressive spectacle lens 114, as produced according to the producing step 178, has the progressive surface 116 which is capable of performing the desired optical correction for the eye of the wearer of the progressive spectacle lens 114. Typically, a set of glasses is produced which are capable of performing the desired optical correction for both eyes of the wearer in a simultaneous fashion. In particular, the progressive spectacle lens 114 is capable of correcting a relatively hyperopic peripheral shift of the eyes of the wearer during distance vision tasks when looking straight ahead, and, concurrently, to reduce an accommodative lag during both near vision tasks, such as reading, and viewing objects at intermediate viewing distances, such as a screen of a computer monitor.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term comprising (and its grammatical variations) as used herein is used in the inclusive sense of having or including and not in the exclusive sense of consisting only of. The terms a and the as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE NUMERALS 110 contour plot
112 surface mean power
114 progressive spectacle lens
116 progressive surface
118 center
120 vertical meridian
122 horizontal meridian
124 central viewing zone
126 peripheral portions (surrounding the central viewing zone)
128 lower viewing zone
130 lower portion
132 peripheral vision zone
134 peripheral vision zone
136 upper viewing zone
138 upper portion
140 top
142 first progressing power region
144 second progressing power region
146 second progressing power region
148 third progressing power region
150 surface astigmatism
152 blending region
154 blending region
156 blending region
158 blending region
160 optical mean power
162 optical astigmatism
170 method for producing a progressive spectacle lens
172 determining step
174 first value
175 second value
176 third value
177 fourth value
178 producing step

The invention claimed is:
1. A spectacle lens comprising:
a central viewing zone configured for distance vision and having a refracting power providing a first stable power region;

a lower viewing zone configured for near vision and having a refracting power providing a second stable power region;

two peripheral vision zones having a refracting power providing a third stable power region and a fourth stable power region, respectively; and an upper viewing zone having a refracting power providing a fifth stable power region, wherein each of the second, third, fourth and fifth stable power regions provide refracting power greater than the refracting power provided by the first stable power region, wherein the central viewing zone is arranged between the lower viewing zone and the upper viewing zone, and wherein the upper viewing zone is configured for intermediate vision.

2. The spectacle lens according to claim 1, wherein the refracting power providing the second stable power region is +1.00 D to +4.00 D greater than the refracting power providing the first stable power region.

3. The spectacle lens according to claim 1, wherein the refracting power providing the second stable power region is +1.50 D to +2.50 D greater than the refracting power providing the first stable power region.

4. The spectacle lens according to claim 1, wherein the refracting power of the third and fourth stable power regions is +1.00 D to +3.50 D greater than the refracting power providing the first stable power region.

5. The spectacle lens according to claim 1, wherein the refracting power of the third and fourth stable power regions is +1.50 D to +2.00 D greater than the refracting power providing the first stable power region.

6. The spectacle lens according to claim 1, wherein the refracting power providing the fifth stable power region is +0.50 D to +2.00 D greater than the refracting power providing the first stable power region.

7. The spectacle lens according to claim 1, wherein the refracting power providing the fifth stable power region is +0.75 D to +1.50 D greater than the refracting power providing the first stable power region.

8. The spectacle lens according to claim 1, wherein a difference between the refracting power providing the second stable power region and the refracting power providing the first stable power region exceeds the difference between the refracting power providing the third and fourth stable power regions and the refracting power providing the first stable power region by +0.50 D or less.

9. The spectacle lens according to claim 1, wherein a difference between the refracting power providing the second stable power region and the refracting power providing the first stable power region and the difference between the respective refracting power providing the third and fourth stable power regions and the refracting power providing the first stable power region is +0.50 D or less.

10. The spectacle lens according to claim 1, wherein a difference between the refracting power providing the second stable power region and the refracting power providing the first stable power region and the difference between the refracting power providing the third and fourth stable power regions and the refracting power providing the first stable power region exceed the difference between the refracting power providing the fifth stable power region and the refracting power providing the first stable power region.

11. The spectacle lens according to claim 1, wherein the refracting power providing the second stable power region and the refracting power providing the third and fourth stable power regions are fully reached at a first distance from a center of a surface of the spectacle lens.

12. The spectacle lens according to claim 11, wherein the refracting power providing the fifth stable power region is fully reached at a second distance from the center of the surface of the spectacle lens, and wherein the first distance exceeds the second distance.

13. A series of spectacle lenses, each spectacle lens in the series being configured to have:

a central viewing zone configured for distance vision and having a refracting power providing a first stable power region;

a lower viewing zone configured for near vision and having a refracting power providing a second stable power region;

two peripheral vision zones having a refracting power providing a third stable power region and a fourth stable power region, respectively; and an upper viewing zone having a refracting power providing a fifth stable power region, wherein each of the second, third, fourth and fifth stable power regions provide refracting power greater than the refracting power provided by the first stable power region, wherein the central viewing zone is arranged between the lower viewing zone and the upper viewing zone wherein a subsequent spectacle lens in the series comprises peripheral portions surrounding the central viewing zone having a range of refracting powers greater than the refracting power providing the first stable power region, and wherein at least one of the second, third, fourth and fifth refracting powers is higher than the corresponding refracting powers of a preceding spectacle lens in the series, while the other refracting powers are equal or higher than the corresponding refracting powers of the preceding spectacle lens in the series.

14. The series of the spectacle lenses according to claim 13, wherein a difference between the second refracting power and the first refracting power of the subsequent spectacle lens in the series is incremented by +0.25 D with respect to the difference between the second refracting power and the first refracting power of the preceding spectacle lens in the series.

15. The series of the spectacle lenses according to claim 13, wherein a difference between the third refracting power and/or the fourth refracting power and the first power of the subsequent spectacle lens in the series is maintained or incremented by +0.25 D with respect to the difference between the third refracting power and/or the fourth refracting power and the first power of the preceding spectacle lens in the series.

16. The series of the spectacle lenses according to claim 13, wherein a difference between the fifth refracting power and the first power of the subsequent spectacle lens in the series is maintained or incremented by +0.25 D with respect to the difference between the fifth refracting power and the first refracting power of the preceding spectacle lens in the series.

17. A method for providing, with a computer, a design of a spectacle lens for the purpose of manufacturing the spectacle lens based on the design, the spectacle lens having:

a central viewing zone configured for distance vision and having a first refracting power providing a first stable power region;

a lower viewing zone configured for near vision and having a refracting power providing a second stable power region; and two peripheral vision zones having a refracting power providing a third stable power region and a fourth stable power region, respectively, the method comprising:

arranging the central viewing zone between the lower viewing zone and an upper viewing zone; and providing the upper viewing zone having a refracting power providing a fifth stable power region, wherein each of the second, third, fourth and fifth stable power regions provide refracting power greater than the refracting power provided by the first stable power region, wherein the upper viewing zone is configured for intermediate vision.

18. The method according to claim 17 further comprising: manufacturing the spectacle lens based on the design.

19. A program stored on a non-transitory storage medium, the program comprising instructions which, when the program is executed by a computer, cause the computer to carry out the method according to claim 17.

20. A non-transitory computer storage medium storing design data of a spectacle lens for the purpose of manufacturing of the spectacle lens, the spectacle lens having:

a central viewing zone configured for distance vision and having a first refracting power providing a first stable power region;

a lower viewing zone configured for near vision and having a refracting power providing a second stable power region; and two peripheral vision zones having a refracting power providing a third stable power region and a fourth stable power region, respectively, the design data being configured to:

arrange the central viewing zone between the lower viewing zone and an upper viewing zone; and provide the upper viewing zone having a refracting power providing a fifth stable power region, wherein each of the second, third, fourth and fifth stable power regions provide refracting power greater than the refracting power provided by the first stable power region, wherein the upper viewing zone is configured for intermediate vision.

* * * * *